Dec. 14, 1965  E. O. SCHWEITZER, JR  3,223,917
MAGNETIC FREQUENCY DOUBLER WITH MEANS FOR PRODUCING
A UNIDIRECTIONAL MAGNETIC FLUX IN SAID DOUBLER
Filed May 15, 1961  2 Sheets-Sheet 1
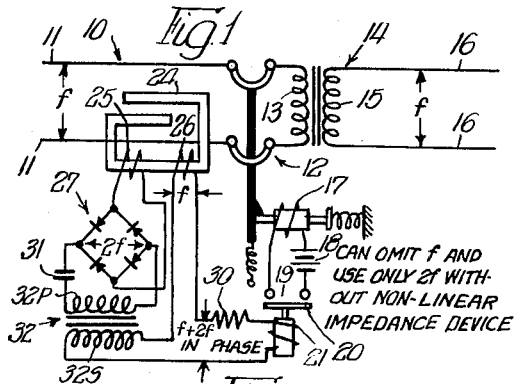
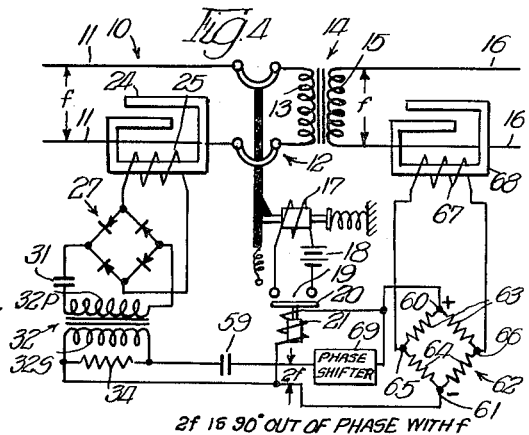
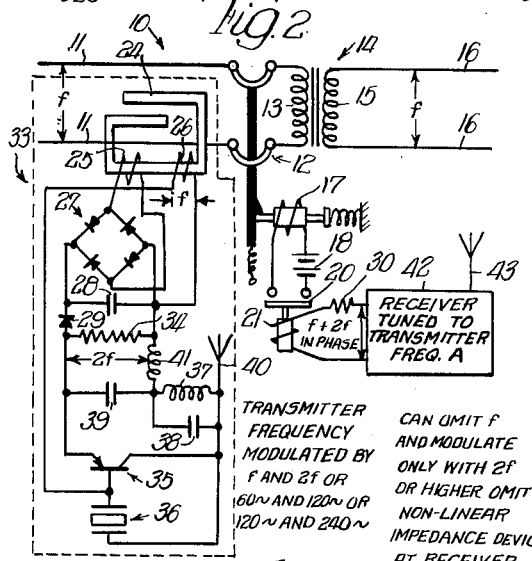
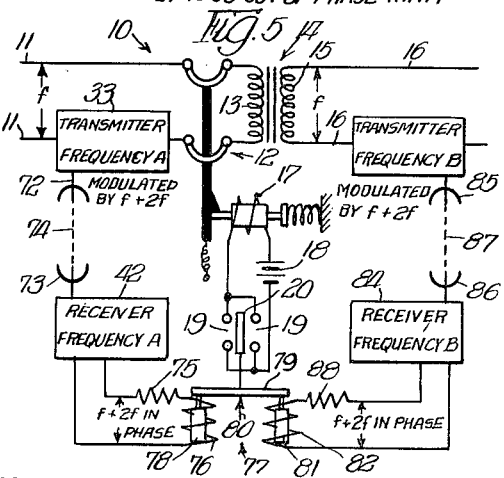
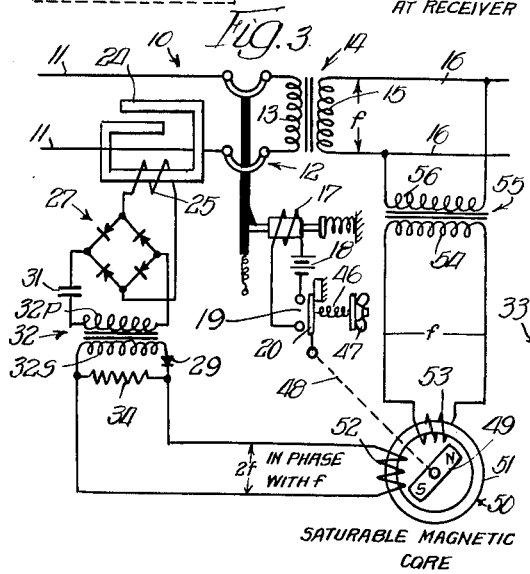
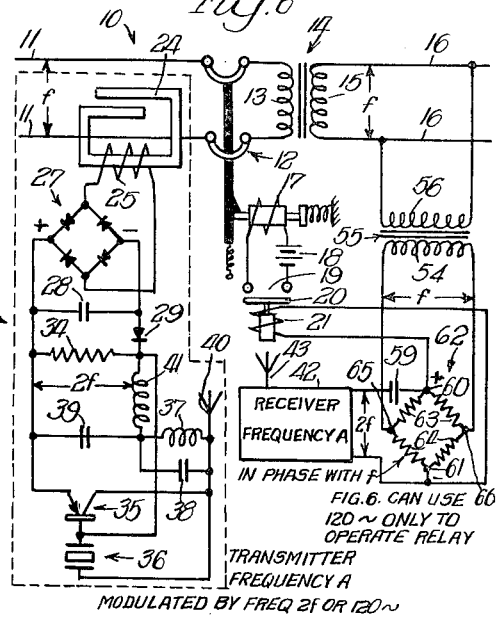

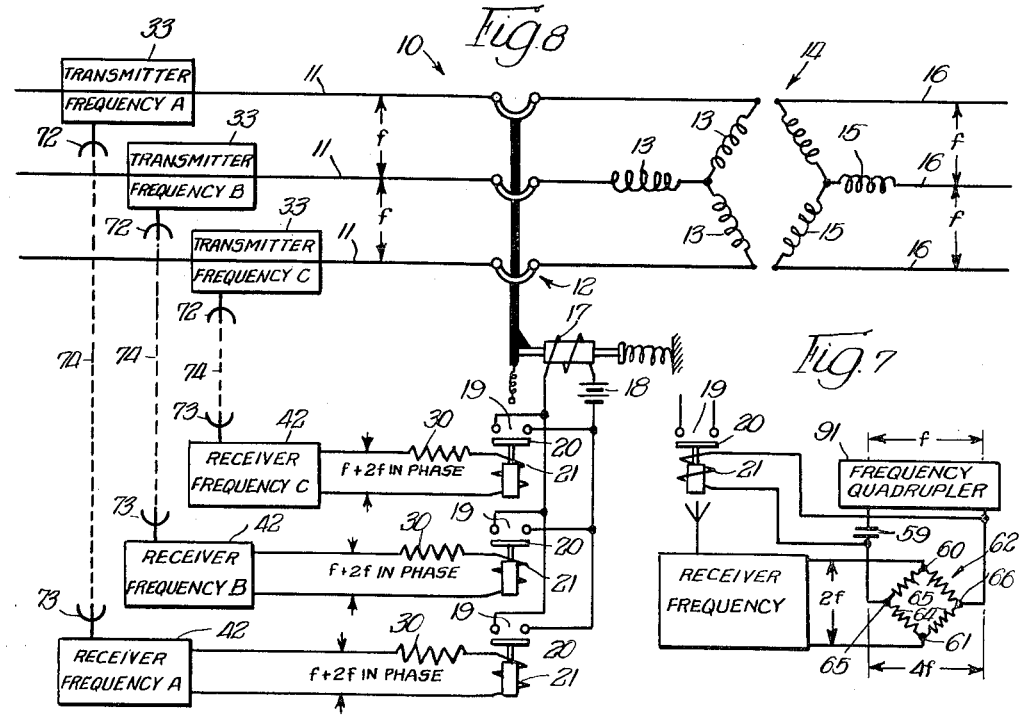
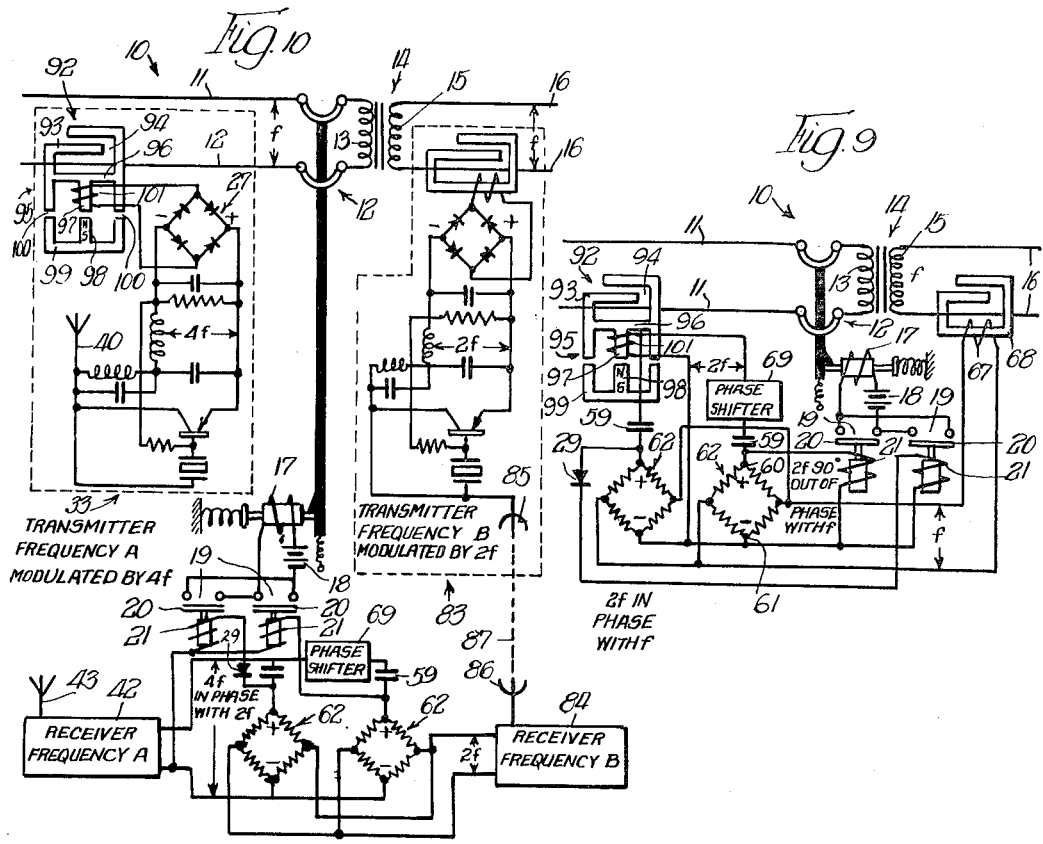

United States Patent Office 3,223,917
Patented Dec. 14, 1965

3,223,917
MAGNETIC FREQUENCY DOUBLER WITH MEANS FOR PRODUCING A UNIDIRECTIONAL MAGNETIC FLUX IN SAID DOUBLER
Edmund O. Schweitzer, Jr., 1002 Dundee Road, Northbrook, Ill.
Filed May 15, 1961, Ser. No. 118,484
6 Claims. (Cl. 321—68)

This invention relates to protecting means for electric power systems and the like. It constitutes an improvement over the inventions disclosed in my U.S. Patent No. 2,724,821, issued November 22, 1955, and in my copending applications Serial No. 576,564, filed April 6, 1956, now Patent No. 3,007,042, issued October 31, 1961, and Serial No. 708,187, filed January 10, 1958 now Patent No. 3,005,134, issued October 17, 1961.

Among the objects of this invention are: To provide for deenergizing a load circuit connected for energization to a power supply circuit of an alternating current power transmission system upon the occurrence of a fault in the load circuit in a new and improved manner; to derive from the electric power transmission system an alternating current having a frequency that is two or more times the frequency of the alternating current in the system and whose magnitude is a function of the magnitude of the alternating current flowing into the system and to utilize such derived current for effecting deenergization of the load circuit; to derive from the electric power system simultaneously a fundamental frequency and its second harmonic the magnitudes of which are functions of the magnitude of the alternating current flowing in the system and to utilize them for tripping a circuit interrupter to deenergize the load circuit; to convert one or both of the derived frequencies into a wave form of energy capable of being transmitted through the atmosphere without the use of electrical conducting means interconnecting the transmitting and receiving stations, to receive such energy, and to reconvert it into an alternating current or currents corresponding to the derived frequency or frequencies for use in tripping the circuit interrupter; to convert the derived frequency or frequencies into radio waves; to direct the wave form of energy along a predetermined path having a limited transverse dimension such that the energy is prevented from radiating transversely substantially beyond such path; to derive the frequency or frequencies from each phase of a polyphase alternating current power transmission system and to modulate a carrier frequency therewith, there being a different carrier frequency for each phase; to apply the derived fundamental and second harmonic frequency currents to a non-linear impedance device for providing a unidirectional effect that is a function of the magnitude of the alternating current flow in the electric power system and to utilize such effect to deenergize the load circuit; to derive from one of the circuits a fundamental frequency and from the other of the circuits a second harmonic thereof and to cause such derived frequencies to interact in such manner as to effect disconnection of the circuits when there is a predetermined difference in the current flows in the circuits; to shift one of the derived frequencies 90° out of phase with the other and to apply them to non-linear impedance means for obtaining a flow of direct current upon predetermined shifting of the phase of the alternating current flow in one of the circuits with respect to that in the other of the circuits; to provide in a single control system for over current and differential tripping of the circuit interrupter by employing a combination of a fundamental frequency and a second harmonic thereof derived from the power supply circuit and from the load circuit and to provide a static frequency changer employing a magnetic circuit energized by a single primary winding in combination with means providing unidirectional magnetic flux.

Other objects of this invention will, in part, be obvious and in part appear hereinafter.

In the drawings:

FIG. 1 is a circuit diagram showing how the present invention can be employed for overload protection in the event that a fault develops in the power system.

FIG. 2 shows how the system illustrated in FIG. 1 can be utilized with a radio link between the high voltage power supply circuit and the trip control means.

FIG. 3 shows another form of over current protection means employing a different form of non-linear impedance device and deriving the fundamental frequency from the load circuit and the second harmonic from the power supply circuit.

FIG. 4 shows how the present invention can be employed for differential protection of a transformer.

FIG. 5 illustrates how the differential protection can be effected employing a radio link between the power supply circuit and the control apparatus and another radio link between the load circuit and the control apparatus.

FIG. 6 illustrates an over current protection system embodying the present invention in which a radio link is employed between the power supply circuit and the trip control means and in which the fundamental frequency is obtained from the load circuit.

FIG. 7 shows a part of the circuit that can be substituted for a corresponding part of the circuit shown in FIG. 6 in order to obtain a frequency from the load circuit which is a second harmonic of the double frequency that is obtained from the power supply circuit.

FIG. 8 shows how the present invention can be employed in conjunction with a polyphase alternating current supply system.

FIG. 9 shows a static frequency changer embodying this invention.

FIG. 10 illustrates a system in which radio links are employed in a system of the type shown in FIG. 9 to provide both over current and differential protection.

Referring now particularly to FIG. 1 of the drawings, it will be observed that the reference character 10 designates, generally, an alternating current electric power system which may operate at a frequency of 60 cycles per second. This is indicated as being a frequency $f$. The electric power system 10 includes a power supply circuit represented by conductors 11—11. It will be understood that the power supply circuit 11—11 can be a single phase circuit or a polyphase circuit and that one of the conductors may be grounded in accordance with conventional practice. The power supply circuit 11—11 is connected by a normally closed circuit interrupter 12 to energize a primary winding 13 of a power transformer that is indicated, generally, at 14. It will be understood that the power transformer 14 is either a single phase transformer or a polyphase transformer, depending upon whether the power supply circuit is a single phase or a polyphase circuit. The power transformer 14 includes a secondary winding 15 that is connected to energize a load circuit represented by the conductors 16—16. As indicated in the drawing the load circuit 16—16 has the frequency $f$ applied thereto. Conventional trip means capable of being electrically operated are employed for controlling the opening of the circuit interrupter 12. Other equally conventional means are employed for closing the circuit interrupter 12. The trip means includes a trip winding or coil 17 that can be energized from any suitable source such as a battery 18. It will be understood that any other source available can be used and that energy for operating the trip means 17 can be derived from the load circuit 16—16, if desired. The trip circuit is completed by the closure of normally open contacts 19 as the result of movement of a bridging contact 20 into engagement therewith. Any suitable means can be employed for operating the bridging contact 20. As illustrated, a relay winding 21 can be used for this purpose. The relay operated by winding 21 may be a polarized relay when its operation depends upon the flow of a direct current component. Otherwise, it may be operable on alternating current.

The electric power system 10 and elements associated therewith that have just been described are common to the various circuit arrangements shown in several of the figures of the drawings. It will be understood that they are conventional and that various modifications thereof can be made. Since the same elements are employed in the other figures of the drawings, the same reference characters are applied thereto and the description thereof will not be repeated.

It is desirable that the relay winding 21 be energized under certain operating conditions of the electric power system 10. For example, in the event that the current flowing in the system exceeds a predetermined value or in the event of a short circuit, it is desirable that the relay winding 21 be energized for moving the bridging contact 20 into engagement with the contacts 19 to energize the trip coil 17 and permit the circuit interrupter 12 to open and disconnect the power supply circuit 11—11 from the power transformer 14 and load circuit 16—16.

In accordance with this invention means are provided for measuring the current flow in one of the conductors forming the power supply circuit 11—11. It will be noted that a magnetic core 24 has one of the conductors 11 extending therethrough so that it functions as a current transformer having a single turn primary winding. In this particular embodiment of the invention secondary windings 25 and 26 are provided on the magnetic core 24 and voltages are induced therein, as will be readily understood, which corresponds to the magnitude of the current flowing in the power supply circuit 11—11. The secondary winding 25 is connected to energize a bridge type rectifier, shown generally at 27, the double frequency output of which is applied through a blocking capacitor 31 to a primary winding 32p of a transformer 32 having a secondary winding 32s. Other frequency multipliers can be used.

Now it will be observed that the other secondary winding 26 on the core 24 is connected in series with the secondary winding 32s and that the frequency output of this winding is the same as the frequency of the power supply circuit 11—11 or 60 cycles. This is indicated at $f$ with the result that the frequencies $f$ and $2f$ are connected in series and applied through a non-linear impedance device 30 across the relay winding 21. As described in more detail in my copending application Serial No. 708,187, filed January 10, 1958, now Patent No. 3,005,134, issued October 17, 1961, when a fundamental and a second harmonic thereof are applied to a non-linear impedance device, such as non-linear resistor 30, the current flow therethrough includes a direct current component the magnitude of which is a function of the magnitude of the fundamental and second harmonic. Advantage is taken of this effect to energize the relay winding 21 upon the occurrence of the predetermined overload or short circuit conditions in the electric power system 10 with the result that the normally open contacts 19 are closed by the bridging contacts 20 to energize the trip coil 17 and cause the circuit interrupter 12 to open and deenergize the power transformer 14 and the load circuit 16—16.

Under certain circumstances it may be desirable to employ only the second harmonic or the frequency $2f$ for energizing the relay winding 21 to trip the circuit interrupter 12. One reason for using the higher frequency is to increase the speed of response of the trip means and energization of the trip coil 17 to a time less than a half cycle of the fundamental frequency $f$. Since the second harmonic or a higher harmonic is employed for this purpose and since this frequency is correspondingly higher than the fundamental frequency $f$, there is a corresponding decrease in the time of response.

In the system shown in FIG. 1 when both the fundamental frequency $f$ and its second harmonic $2f$ are employed in the manner described, it will be understood that they are in phase as indicated in the diagram. Under certain operating conditions, described hereinafter, it is desirable to operate the system with $f$ and $2f$ out of phase through a predetermined extent.

In the system illustrated in FIG. 1 the magnetic core 24 is in relatively close proximity to one of the conductors of the power supply circuit 11—11. Depending upon the voltage of the power supply circuit 11—11, appropriate precautions must be taken from an insulation standpoint. Ordinarily the trip coil 17 and associated parts operate at ground potential. Thus suitable precautions are required to be taken in order to avoid a failure of insulation. When the power supply circuit 11—11 operates at a relatively high voltage, such as at a voltage of 115 kv. or higher, it is impractical to use the direct connected system illustrated in FIG. 1.

In order to take advantage of the insulation of the power supply circuit 11—11 and to avoid the necessity for providing a direct connection between the control means directly associated with the power supply circuit 11—11 and the trip means for the circuit interrupter 12, provision can be made for using a radio link generally as described in my Patent No. 2,724,821, issued November 22, 1955.

FIG. 2 shows such a system in which provision is made for controlling the energization of the relay winding 21 through a radio link which is provided by a radio transmitter that is indicated, generally, at 33 and includes the various circuit elements enclosed in the broken line outline. The output of the bridge type rectifier 27 is partially filtered by a capacitor 28 to provide a 120 cycle or $2f$ output which is used as a modulating frequency for the radio transmitter 33. When the current flow through the power supply circuit 11—11 attains a predetermined maximum value, sufficient voltage is generated in secondary winding 25 to cause a zener diode 29 to break down and become conducting with the result that current flows through a resistor 34. A potential appears across the terminals of the resistor 34 for energizing a transistor 35 and its circuit the frequency of which is controlled by a quartz crystal 36. The quartz crystals 36 may be selected to operate the radio transmitter 33 at any desired frequency. For example, it may be chosen to operate at a frequency of the order of 27.2 megacycles, this being in the band of frequencies that it is permissible to use for applications such as that disclosed herein. The frequency of the radio transmitter 33 also is controlled by an inductor 37 and capacitors 38 and 39 to the end that a signal is radiated by the antenna 40. It will be understood that the carrier frequency of the quartz crystal 36 and associated control circuits is modulated not only by the frequency $2f$ but also by the frequency $f$ to the end that both frequencies are transmitted from the antenna 40. The magnitude of the modulation, of course, is determined by the current flow in the power supply circuit 11—11.

It will be understood that the radio transmitter 33 is relatively small in size, is powered through the magnetic core 24 and can be constructed so as to form a unitary structure therewith that can be mounted readily on one of the conductors of the power supply circuit 11—11. Thus, advantage is taken of the insulation of the power supply circuit 11—11 and it is unnecessary to take any particular precautions with respect to the insulation of the link between the radio transmitter 33 and the trip coil 17 which can be located at ground potential.

Cooperating with the radio transmitter 33 is a radio receiver 42 of conventional construction that is tuned to the frequency of the transmitter 33 which is indicated as frequency A. The radio receiver 42 has an antenna 43 to receive the signal that is radiated from the antenna 40 of the radio transmitter 33. The output of the radio receiver 42 which is in the form of the fundamental frequency and its second harmonic is applied, as described hereinbefore, to non-linear impedance device 30 in the form of a non-linear resistor so that the direct current component of the current flowing therethrough varies as a function of the magnitude of the fundamental frequency $f$ and its second harmonic $2f$. When this is sufficient, the relay winding 21 is energized to move the bridging contact 20 into engagement with the normally open contacts 19 for completing the energizing circuit for the trip coil 17 to the end that the circuit interrupter 12 is opened. If desired, a polarized relay can be employed for operation by the relay winding 21 in lieu of the conventional relay construction shown.

It will be understood that the radio transmitter 33, instead of being modulated by the fundamental frequency $f$ and its second harmonic, can by suitable frequency multipliers have its carrier frequency modulated by a fundamental or 120 cycle frequency and its second harmonic $4f$ or 240 cycles. Also it will be understood that the fundamental frequency $f$ can be omitted and the radio transmitter 33 modulated only with a higher frequency such as $2f$, $3f$, $4f$, etc., and that this frequency alone can be employed for energizing the relay 21 without requiring the use of the non-linear impedance device or non-linear resistor 30. The reason for using the high frequency is to increase the speed of response upon the occurrence of a fault in the electric power system 10.

Referring now particularly to FIG. 3 of the drawings, it will be observed that the arrangement there shown is similar to that illustrated in FIG. 1 and described hereinbefore. Instead of employing the relay winding 21 for operating the bridging contact 20, the latter is mounted for movement with a shaft 48, that is indicated by a broken line, extending from a permanent magnet rotor 49 that forms a part of a non-linear impedance device of the magnetic type that is illustrated, generally, at 50. It includes a saturable magnetic core 51 provided with windings 52 and 53. In my copending application Serial No. 576,564, filed April 6, 1956, now Patent No. 3,004,-381, issued October 17, 1961, there is provided a description of the manner in which a non-linear impedance device of the type illustrated at 50 operates. It will be noted that the winding 52 is connected for energization across the resistor 34 so that the second harmonic frequency or $2f$ is applied thereto from the bridge type rectifier 27. The other winding 53 is energized with the fundamental frequency $f$ that is obtained from a secondary winding 54 that forms a part of a transformer, shown generally at 55, having a primary winding 56 that is connected for energization across the load circuit 16—16.

It will be understood that the fundamental frequency $f$, applied to the winding 53 and the second harmonic $2f$ thereof, applied to the winding 52 are in phase and that when the current flow in the power supply circuit 11—11 exceeds a predetermined value, the zener diode 29c becomes conducting. Sufficient currents then flow through the windings 52 and 53 to rotate the permanent magnet rotor 49 against the tension of the spring 46 which is adjusted by adjusting nut 47 to close normally open contacts 19 and complete an energizing circuit from the battery 18 to the trip coil 17 for tripping the circuit interrupter 12. The current flowing in the winding 52 always varies as a function of the current flow in the power supply circuit 11—11. When this current flow exceeds a predetermined value as determined by the tension of the spring 46, the contacts 19 are bridged by the bridging contact 20 to trip the circuit interrupter 12 in the manner described.

FIG. 4 shows a differential protection system for the electric power system 10. To a considerable extent the circuit elements illustrated in FIG. 1 are employed here. It will be understood that provision is made for effecting the opening of the circuit interrupter 12 in the event that there is a predetermined difference in the currents flowing in the power supply circuits 11—11 and the load circuits 16—16. It is usually the case that this difference in current flow involves a greater flow of current to the primary winding 13 than flows from the secondary winding 15 of the power transformer 14. The usual reason for this is that one or more turns of one of these windings become short circuited. As a result of this condition there is a shift in phase of the current flow in the load circuit 16—16 with respect to the flow of current in the power supply circuit 11—11. Advantage is taken of this difference in phase shift to detect the fault condition and provides for tripping the circuit interrupter 12.

Referring now particularly to FIG. 4, it will be observed that the second harmonic frequency $2f$ is supplied from the bridge type rectifier 27 through a capacitor 59 and across direct current terminals 60 and 61 of the non-linear impedance device of the bridge type that is illustrated, generally, at 62. In my copending application Serial No. 576,564, filed April 6, 1956, now Patent No. 3,004,381, issued October 17, 1961, there is included a description of the operation of a non-linear impedance device of the bridge type. For present purposes it is pointed out that it includes two adjacent arms with the terminal 60 between non-linear resistors 63—63 while the other two arms comprise linear resistors 64—64 with the terminal 61 therebetween. The other terminals 65 and 66 have applied thereto the fundamental frequency $f$ from a secondary winding 67 that is located on a magnetic core 68 through which one of the load circuit conductors 16—16 extends and functions therewith as a single turn primary winding. A phase shifter 69 is interposed between the bridge type rectifier 27 and the non-linear impedance device 62 and it is adjusted to the end that the second harmonic $2f$ is normally 90° out of phase with the fundamental frequency $f$ when the electric power system 10 is functioning normally. Under these conditions no direct current potential appears between the direct current terminals 60 and 61 so that the relay winding 21 connected thereacross is not energized with direct current. The alternating current flowing between terminals 60 and 61 is insufficient to effect movement of the bridging contact 20 to the position where the normally open contacts 19 are bridged.

Assuming now that a fault develops in the power transformer 14 involving one or more short circuited turns of the primary winding 13 or of the secondary winding 15, then there will be a shift in the phase of the current flow in the secondary winding 15 and in the load circuit 16—16 with respect to the phase of the current flow in the primary winding 13 and power supply circuit 11—11. This phase shift will be reflected in a shift in the phase of the frequency $f$ with respect to the phase of the frequency $2f$. As described in my copending application Serial No. 576,564, filed April 6, 1956, now Patent No. 3,004,-381, issued October 17, 1961, this phase shift from a condition where the fundamental frequency $f$ is normally 90° out of phase with its second harmonic $2f$, causes a flow of a direct current component between terminals 60 and 61 the magnitude of which is a function of the degree of phase shift with a maximum change taking place as the phase is shifted from the 90° position. Accordingly, under this conditions sufficient current flows through the relay winding 21 having a direct current component capable of operating the bridging contact 20 to the closed position with the result that the normally open contacts 19 are bridged, trip coil 17 is energized and the circuit interrupter 12 is tripped.

In FIG. 5 of the drawings there is shown a modification of the differential protective system shown in FIG. 4 and previously described. In FIG. 5 a portion of the arrangement illustrated in FIG. 2 is employed. It will be observed that the radio transmitter 33 is associated with the power supply circuit 11—11 and that it cooperates with the receiver 42, both operating on a carrier frequency A that is modulated by the fundamental frequency $f$ and its second harmonic $2f$. It will be noted that the transmitter 33 is provided with a directional antenna 72 that is beamed toward a directional antenna 73 on the receiver 42 along a path 74 which has a limited transverse dimension in order to avoid interference with other radio transmitting and receiving apparatus. The output of the receiver 42 comprising the fundamental $f$ and its second harmonic $2f$ in phase is applied to a non-linear resistor 75 in series with a winding 76 that forms a part of a balance relay 77. The winding 76 cooperates with an armature 78 at one end of a beam 79 that is fulcrumed at 80 and which carries the bridging contact 20 which is associated with two sets of normally open contacts 19—19 that are connected in parallel so that regardless of the direction in which the beam 79 rocks, one or the other of the sets of contacts 19—19 will be closed to complete the energizing circuit for the trip coil 17. At the other end of the beam 79 is an armature 81 with which a winding 82 cooperates. The winding 82 is energized from the load circuit 16—16 by a radio transmitter 83 operating on a carrier frequency B. Otherwise the transmitter 83 corresponds to the transmitter 33 previously described. A receiver 84 is arranged to be tuned to the frequency B. At directional antenna 85 is provided for the transmitter 83 and a similar directional antenna 86 is provided for the receiver 84 so that the transmission is along a path 87 between the transmitter 83 and receiver 84. The output of the receiver 84 comprising the fundamental frequency and its second harmonic $2f$ in phase is applied through a non-linear resistor 88 in series with the winding 82.

Under normal operating conditions for the arrangement shown in FIG. 5, with balanced conditions existing with respect to the power supply circuit 11—11 and the load circuit 16—16, the current flows through the windings 76 and 82 of the balance relay 77 are equal and the bridging contact 20 is held out of contact engagement with either of the sets of normally open contacts 19—19. However, should this balanced condition in the power supply circuit 11—11 with respect to the load circuit 16—16 be upset, then the current flow in one or the other of the windings 76 or 82 will exceed that in the other and the beam 79 will be rocked to close one or the other of the sets of contacts 19—19. Since they are connected in parallel, the trip coil 17 will be energized and the circuit interrupter 12 will be tripped.

If desired, a second circuit interrupter 12 can be provided in the load circuit 16—16 with trip means operating in parallel with the trip coil 17 to the end that the power transformer 14 is disconnected from both the power supply circuit 11—11 and the load circuit 16—16 upon the occurrence of fault conditions resulting from unbalanced current conditions in the power supply circuit 11—11 and the load circuit 16—16.

FIG. 6 shows an over current responsive system which combines certain of the features illustrated in FIGS. 2, 3 and 4 and described hereinbefore. Here the radio transmitter 33 is modulated by the second harmonic $2f$ derived from the power supply circuit 11—11. This second harmonic $2f$ demodulated from the receiver 42 is applied through the capacitor 59 to the bridge type non-linear impedance device 62. The fundamental frequency $f$ is obtained from the secondary winding 54 of the transformer 55 whose primary winding 56 is connected for energization across the load circuit 16—16. Upon the occurrence of predetermined flow of current in the power supply circuit 11—11, a corresponding flow of second harmonic $2f$ takes place and resulting voltage is applied across the direct current terminals 60 and 61 of the bridge type non-linear impedance device 62 with the result that sufficient current including a direct current component goes through the relay winding 21 to cause the bridging contact 20 to bridge the normally open contact 19 and energize the trip coil 17. As a result the circuit interrupter 12 is tripped.

Instead of modulating the transmitter 33 with the second harmonic $2f$, it can be modulated with a higher harmonic in a manner to be described hereinafter. In addition the second harmonic $2f$ or a higher harmonic can be employed by itself for operating the relay winding 21 under predetermined overload conditions. In such case the relay winding 21 becomes a current measuring device arranged to exert sufficient magnetic force on the bridging contact 20 under predetermined operating conditions corresponding to predetermined current flow in the power supply circuit 11—11 to bridge the contacts 19 and energize the trip coil 17.

In FIG. 7 there is shown a modification of the receiving circuit which can be employed in lieu of that shown in FIG. 6. Here a frequency quadrupler 91 is interposed between the source of frequency $f$ and the bridge type non-linear impedance device 62. Accordingly, a frequency of $4f$ is applied across the terminals 65 and 66 which now become the direct current terminals and accordingly the capacitor 59 is interposed in this circuit. Also the relay winding 21 is connected across the terminals 65 and 66 as indicated. One reason for employing the frequency quadrupler 91 in combination with the second harmonic derived from the power supply circuit 11—11 is to avoid with more certainty any influence of extraneous conditions that might be effective to cause a false operation of the trip coil 17.

FIG. 8 shows how the over current responsive system illustrated in FIG. 2 can be applied to a polyphase system. Here it will be observed that the circuit interrupter 12 is a polyphase circuit interrupter and that it is arranged to interconnect the polyphase power supply circuit 11—11—11 to the primary windings 13—13—13 of a polyphase power transformer 14 having secondary windings 15—15—15 for energizing a load circuit 16—16—16. Associated with each of the power supply conductors 11 is a transmitter 33. It will be noted that each of the three transmitters 33 is arranged to operate respectively at frequencies A–B–C and that the three associated receivers 42—42—42 are arranged to be tuned to these frequencies A–B–C respectively. The directional antennae 72 and 73 are employed and the paths 74—74—74 therebetween are sufficiently separated so that there is no interference. The trip coil 17 is arranged to be operated on closure of any of the normally open contacts 19—19—19, as will be readily understood, resulting from the occurrence of a fault individual to any one of the phases or power supply circuits 11—11—11.

FIG. 9 shows an arrangement for providing simultaneously over current and differential protection for the electric power system 10. It will be observed that certain features of the arrangement shown in FIGS. 1 and 4 are here employed to provide for such protection.

In the arrangement shown in FIG. 9 the second harmonic $2f$ is obtained by means of a magnetic frequency doubler that is indicated, generally, at 92. It includes a magnetic core 93 which is similar, for example, to the magnetic core 24 and is associated with one of the conductors of the power supply circuit 11—11 so that this conductor functions as a single turn primary winding. The magnetic core 93 may be partially open, as shown, or completely closed as desired and it has a window 94 to receive the conductor 11. The magnetic core 93 is provided with an E-shaped section that is indicated, generally, at 95. The common portion 96 of the E-shaped 95 is arranged to be saturated with alternating flux on flow of predetermined alternating current in the associated conductor 11. The E-shape has a central leg 97 opposite which there is positioned a permanent magnet 98. If desired, a magnetic shunt 99 can be provided for interconnecting the premanent magnet 98 to the outer legs of the E-shaped section 96 with air gaps 100—100 therebetween. A secondary winding 101 is mounted on the central leg 97 and it corresponds to the secondary winding 25 described hereinbefore except that, before of the provision of the E-shaped section 96 on the magnetic core 95 with the saturable portion 96 in combination with the permanent magnet 98 a frequency 2f which is double that of the frenquency f of the power supply circuit 11—11 is induced therein. This construction facilitates the use of the magnetic frequency doubler 92 with a single turn primary winding which extends through the window 94.

The unidirectional flux from the permanent magnet 98 flows through the central leg 97 and then in opposite directions therefrom into the common portion 96 of the magnetic core 93 for return to the permanent magnet 98. On one half cycle of the flow of alternating current in conductor 11, magnetic flux is induced in the magnetic core 93 which opposes the unidirectional magnetic flux in one part of the common portion 96 and thereby changes the flux in the central leg 97 with the result that, during this one half cycle, a complete cycle of alternating current is induced in the secondary winding 101. During the next half cycle of the flow of alternating current in conductor 11, the unidirectional magnetic flux in the other part of the common portion 96 is opposed with a corresponding change in the flux in the central leg 97 and another complete cycle of alternating current is induced in the secondary winding 101. Thus, the alternating current induced in secondary winding 101 has a frequency that is twice that of the alternating current in conductor 11.

It will be observed in FIG. 9 that the second harmonic 2f is combined through two bridge type non-linear impedance devices 62—62 with the fundamental frequency f obtained from the secondary winding 67 on the magnetic core 68 which is associated with the load circuit 16—16.

For over current protection the second harmonic 2f is applied through the capacitor 59 to the bridge type non-linear impedance device 62 shown at the left side of the circuit in FIG. 9 and a zener diode 29 is provided for preventing the energization of the associated relay winding 21 until a predetermined over current exists. When this occurs, the normally open contacts 19 are bridged by the bridging contact 20 and the trip coil 17 is energized to trip the circuit interrupter 12 in the manner previously described.

In order to provide the differential portection the second harmonic induced in the secondary winding 101 is caused to energize the other bridge type non-linear impedance device 62 through the phase shifter 69 which is adjusted, as described previously, so that the second harmonic 2f is 90° out of phase with the fundamental frequency f under normal operating conditions. Upon the occurrence of a short circuited turn in one of the windings 13 or 15 of the power transformer 14, the phase relationship between the current flowing in the load circuit 16—16 is changed with respect to that of the current flowing in the power supply circuit 11—11. Accordingly, a direct potential appears between the terminals 60 and 61 of the bridge type non-linear impedance device 62 associated with the phase shifter 69 and, as a result, the associated relay winding 21 is energized to move bridging contact 20 into engagement with the normally open contacts 19 associated therewith to energize the trip coil 17 and open the circuit interrupter 12.

FIG. 10 shows how the arrangement illustrated in FIG. 9 can be practiced using the radio transmitter 33 and radio receiver 42 associated with the power supply circuit 11—11. Also FIG. 10 shows the transmitter 83 associated with receiver 84. In this arrangement the carrier frequency B at which the transmitter 83 operates is modulated with the second harmonic 2f which is obtained from the load circuit 16—16. The magnetic frequency doubler 92 is employed in conjunction with the bridge type rectifier 27 to quadruple the frequency derived from the power supply circuit 11—11 and the transmitter frequency A of the transmitter 33, accordingly, is modulated with the frequency 4f. The fundamental frequency 2f and second harmonic 4f are combined in the two non-linear impedance devices 62—62, as described for FIG. 9, to provide simultaneously the over current protection and the differential protection. It will be understood that the transmitter frequency A of the transmitter 33 can be modulated with the frequency f, if desired.

Since certain further changes can be made in the foregoing system and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A magnetic frequency doubler comprising, in combination, a magnetic core having a window for receiving therethrough a primary winding in which alternating current flows and an E-shaped section extending laterally therefrom the common portion of which is saturated with alternating flux on flow of predetermined alternating current in said primary winding, means causing a unidirectional magnetic flux in the central leg of said E-shaped section, and a winding on said central leg into which an alternating current is induced having a frequency twice that of the alternating current in said primary winding.

2. A magnetic frequency doubler comprising, in combination, a magnetic core having a window for receiving therethrough a primary winding in which alternating current flows and an E-shaped section extending laterally therefrom the common portion of which is saturated with alternating flux on flow of predetermined alternating current in said primary winding a permanent magnet juxtaposed to the central leg of said E-shaped section for causing a unidirectional magnetic flux therein, and a winding on said central leg into which an alternating current is induced having a frequency twice that of the alternating current in said primary winding.

3. A magnetic frequency doubler comprising, in combination, a magnetic core having a window for receiving therethrough a single turn primary winding in which alternating current flows and an E-shaped section extending laterally therefrom the common portion of which is saturated with alternating flux on flow of predetermined alternating current in said primary winding, means causing a unidirectional magnetic flux in the central leg of said E-shaped section, and a winding on said central leg into which an alternating current is induced having a frequency twice that of the alternating current in said primary winding.

4. A static magnetic frequency doubler comprising, in combination, a magnetic core having a window for receiving therethrough a primary winding in which alternating current flows and a central leg extending laterally from one of the sides of said magnetic core, means causing unidirectional magnetic flux to flow in said central leg and in opposite directions in that portion of said one side of said magnetic core on opposite sides from which said central leg extends, and a winding on said central leg into which an alternating current is induced having a frequency twice that of the alternating current in said primary winding.

5. A static magnetic frequency doubler comprising, in combination, a magnetic core having a window for receiving therethrough a primary winding in which alternating current flows and an E-shaped section extending laterally therefrom through the common portion of which alternating flux is induced on flow of alternating current in said primary winding, means causing a unidirectional magnetic flux to flow in the central leg of said E-shaped section and in opposite directions in said common portion, and a winding on said central leg into which an alternating current is induced having a frequency twice that of the alternating current in said primary winding.

6. A static magnetic frequency doubler comprising, in combination, a magnetic core having a window for receiving therethrough a single turn primary winding in which alternating current flows and an E-shaped section extending laterally therefrom the common portion of which is saturated with alternating flux on flow of predetermined alternating current in said primary winding, means causing a unidirectional magnetic flux in the central leg of said E-shaped section and in opposite directions in said common portion, and a winding on said central leg into which an alternating current is induced having a frequency twice that of the alternating current in said primary winding.

References Cited by the Examiner
UNITED STATES PATENTS

| | | | |
|---|---|---|---|
| 1,335,256 | 3/1920 | Petersen et al. | 317—29 |
| 2,189,630 | 2/1940 | Evans | 317—29 |
| 2,309,586 | 1/1943 | Haines | 321—61 |
| 2,424,451 | 7/1947 | Giannini | 321—68 |
| 2,602,841 | 7/1952 | Applegate | 317—29 |
| 2,611,120 | 9/1952 | McCreary | 321—68 |
| 2,883,604 | 4/1959 | Mortimer | 321—68 |

LLOYD McCOLLUM, *Primary Examiner.*

SAMUEL BERNSTEIN, RALPH BLAKESLEE,
*Examiners.*